US010895315B2

(12) United States Patent
Martinez et al.

(10) Patent No.: US 10,895,315 B2
(45) Date of Patent: Jan. 19, 2021

(54) SYSTEMS AND METHODS FOR IMPLEMENTING NODE TO NODE CONNECTIONS IN MECHANIZED ASSEMBLIES

(71) Applicant: DIVERGENT TECHNOLOGIES, INC., Los Angeles, CA (US)

(72) Inventors: Antonio Bernerd Martinez, El Segundo, CA (US); Eahab Nagi El Naga, Topanga, CA (US); David Brian TenHouten, Los Angeles, CA (US); John Russell Bucknell, El Segundo, CA (US); Broc William TenHouten, Rancho Palos Verdes, CA (US); Chukwubuikem Marcel Okoli, Los Angeles, CA (US); Thomas Samuel Bowden, Jr., Los Angeles, CA (US); Muhammad Faizan Zafar, Long Beach, CA (US)

(73) Assignee: Divergent Technologies, Inc., Los Angeles, CA (US)

(*) Notice: Subject to any disclaimer, the term of this patent is extended or adjusted under 35 U.S.C. 154(b) by 390 days.

(21) Appl. No.: 15/644,719

(22) Filed: Jul. 7, 2017

(65) Prior Publication Data
US 2019/0011034 A1 Jan. 10, 2019

(51) Int. Cl.
*B32B 3/10* (2006.01)
*F16H 57/029* (2012.01)
(Continued)

(52) U.S. Cl.
CPC ............ *F16H 57/029* (2013.01); *B22F 7/08* (2013.01); *B23K 26/342* (2015.10); *B32B 1/08* (2013.01);
(Continued)

(58) Field of Classification Search
None
See application file for complete search history.

(56) References Cited

U.S. PATENT DOCUMENTS 4,955,089 A 9/1990 Beale
5,203,226 A 4/1993 Hongou et al.
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

*Primary Examiner* — Christopher M Polley
(74) *Attorney, Agent, or Firm* — Arent Fox LLP

(57) ABSTRACT

Techniques for joining nodes and subcomponents are presented herein. An additively manufactured first node or subcomponent has a groove. An additively manufactured second node or subcomponent has a tongue configured to extend into and mate with the groove to form a tongue-and-groove connection between the first and second node or subcomponent. In some aspects, the tongue-groove connection may extend substantially around a periphery of the node or subcomponent. In other aspects, a first subcomponent having a fluid pipe interface may be coupled via a tongue-groove connection to a second subcomponent having a fluid pipe interface, thereby enabling fluid to flow between subcomponents of the resulting integrated component.

21 Claims, 11 Drawing Sheets

(51) Int. Cl.
*B33Y 10/00* (2015.01)
*B33Y 80/00* (2015.01)
*B32B 1/08* (2006.01)
*B32B 15/04* (2006.01)
*B32B 37/12* (2006.01)
*B32B 7/12* (2006.01)
*B32B 37/24* (2006.01)
*B32B 3/06* (2006.01)
*B23K 26/342* (2014.01)
*F16H 57/032* (2012.01)
*B22F 7/08* (2006.01)
*F16H 57/04* (2010.01)
*B22F 3/105* (2006.01)
*F16H 57/02* (2012.01)

(52) U.S. Cl.
CPC ........... *B32B 3/06* (2013.01); *B32B 7/12* (2013.01); *B32B 15/043* (2013.01); *B32B 37/12* (2013.01); *B32B 37/24* (2013.01); *B33Y 10/00* (2014.12); *B33Y 80/00* (2014.12); *F16H 57/032* (2013.01); *B22F 3/1055* (2013.01); *B32B 2597/00* (2013.01); *F16H 57/0423* (2013.01); *F16H 2057/02017* (2013.01)

(56) References Cited

U.S. PATENT DOCUMENTS

| | | |
|---|---|---|
| 5,670,109 A | 9/1997 | DeRees |
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |

(56) References Cited

U.S. PATENT DOCUMENTS

| | | |
|---|---|---|
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |

(56) References Cited

U.S. PATENT DOCUMENTS

| | | |
|---|---|---|
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0070006 A1* | 3/2006 | Erol .............. H04N 1/00326 715/764 |
| 2006/0108783 A1 | 5/2006 | Ni et al. |
| 2006/0236544 A1 | 10/2006 | Huskamp et al. |
| 2009/0085257 A1* | 4/2009 | Yang .............. B29C 65/48 264/401 |
| 2014/0277669 A1 | 9/2014 | Nardi et al. |
| 2016/0059490 A1 | 3/2016 | Stafford |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008119002 A2 | 10/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2009048682 A1 | 3/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
First Notification to Make Rectification dated Dec. 19, 2018, regarding China Application No. CN201821066588.0.
International Search Report and Written Opinion dated Oct. 29, 2018, regarding PCT/US2018/040053.

* cited by examiner

SYSTEMS AND METHODS FOR IMPLEMENTING NODE TO NODE CONNECTIONS IN MECHANIZED ASSEMBLIES

BACKGROUND

Field

The present disclosure relates generally to techniques for joining subcomponents, and more specifically to joining nodes and other subcomponents using additively manufactured parts and techniques.

Background

Three-dimensional (3-D) printing, also referred to as additive manufacturing (AM), has recently presented new opportunities to more efficiently build automobiles and other transport structures such as aircraft, boats, motorcycles, busses, trains and the like. Applying AM processes to industries that produce these products has proven to produce a structurally more efficient transport structure. For example, an automobile produced using 3D printed components can be made stronger, lighter, and consequently, more fuel efficient. Moreover, AM enables manufacturers to 3-D print parts that are much more complex and that are equipped with more advanced features and capabilities than parts made via traditional machining and casting techniques.

Despite these recent advances, a number of obstacles remain with respect to the practical implementation of AM techniques in transport structures and other mechanized assemblies. For instance, regardless of whether AM is used to produce various components of such devices, manufacturers typically rely on labor-intensive and expensive techniques such as welding, riveting, etc., to join components together, such as nodes used in a transport structure. The deficiencies associated with welding and similar techniques are equally applicable to components, such as a vehicle gear case, that are currently too large to 3-D print in a single AM step. A given 3-D printer is usually limited to rendering objects having a finite size, often dictated by the available surface area of the 3-D printer's build plate and the allowable volume the printer can accommodate. In these instances, manufacturers are often relegated to building the component using the traditional, expensive and time-consuming machining techniques. Alternatively, manufacturers may 3-D print a number of subcomponents and combine them to form a complete, functional component.

SUMMARY

Several aspects of techniques for joining nodes and subcomponents using an adhesive will be described more fully hereinafter with reference to three-dimensional (3D) printing techniques.

One aspect of an apparatus includes an additively manufactured first node having a groove, and an additively manufactured second node having a tongue extending into the groove to form a tongue-and-groove connection between the first and second node.

Another aspect of an apparatus includes an additively manufactured first subcomponent including a tongue structure disposed along a first peripheral region thereof, and an additively manufactured second subcomponent comprising a groove structure disposed along a second peripheral region thereof, wherein the tongue structure is configured to mate with the groove structure along the first and second peripheral regions.

Another aspect of an apparatus includes an additively manufactured first subcomponent comprising a first outer wall, and an additively manufactured second subcomponent comprising a second outer wall, wherein the first and second subcomponents are mated via a tongue and grove connection disposed circumferentially around respective edges of the first and second outer walls.

An aspect of a method for manufacturing a component for a transport structure includes additively manufacturing a first subcomponent comprising a tongue structure disposed along a first peripheral region, additively manufactured a second subcomponent comprising a groove structure disposed along a second peripheral region, and mating the tongue structure with the groove structure along the first and second peripheral regions.

Another aspect of a method includes additively manufacturing a first subcomponent comprising a first outer wall, additively manufacturing a second subcomponent comprising a second outer wall, and mating the first and second subcomponents via a tongue-and-groove connection disposed circumferentially around respective edges of the first and second outer walls.

It will be understood that other aspects of joining nodes and subcomponents with adhesive will become readily apparent to those skilled in the art from the following detailed description, wherein it is shown and described only several embodiments by way of illustration. As will be appreciated by those skilled in the art, the joining of additively manufactured nodes and subcomponents can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatuses and methods for joining nodes and subcomponents with adhesive will now be presented in the detailed description by way of example, and not by way of limitation, in the accompanying drawings, wherein.

DETAILED DESCRIPTION

Figure 1:
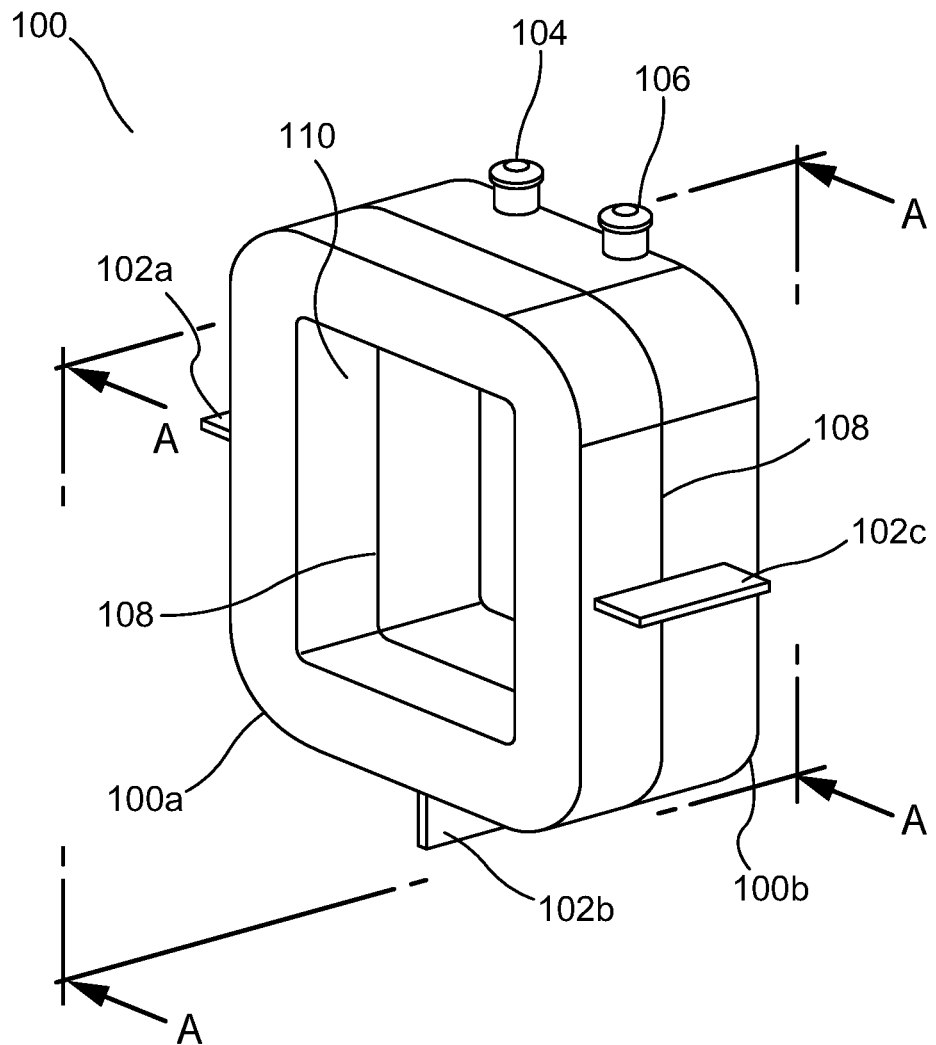
FIG. 1 shows a perspective view illustrating an additively manufactured node-node joint.

The detailed description set forth below in connection with the drawings is intended to provide a description of exemplary embodiments of joining additively manufactured nodes and subcomponents, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting AM parts and/or commercial off the shelf (COTS) components. AM parts are printed three-dimensional (3D) parts that are printed by adding layer upon layer of a material based on a preprogramed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like, and other mechanized assemblies, without departing from the scope of the invention.

In one aspect of the disclosure, a joining technique for additively manufactured nodes is disclosed. A node is an example of an AM part. A node may be any 3-D printed part that includes a socket or other mechanism (e.g., a feature to accept these parts) for accepting a component such as a tube and/or a panel. The node may have internal features configured to accept a particular type of component. Alternatively or conjunctively, the node may be shaped to accept a particular type of component. A node, in some embodiments of this disclosure may have internal features for positioning a component in the node's socket. However, as a person having ordinary skill in the art will appreciate, a node may utilize any feature comprising a variety of geometries to accept any variety of components without departing from the scope of the disclosure. For example, certain nodes may include simple insets, grooves or indentations for accepting other structures, which may be further bound via adhesives, fasteners or other mechanisms.

Nodes as described herein may further include structures for joining tubes, panels, and other components for use in a transport structure or other mechanical assembly. For example, nodes may include joints that may act as an intersecting points for two or more panels, connecting tubes, or other structures. To this end, the nodes may be configured with apertures or insets configured to receive such other structures such that the structures are fit securely at the node. Nodes may join connecting tubes to form a space frame vehicle chassis. Nodes may also be used to join internal or external panels and other structures. In many cases, individual nodes may need to be joined together to accomplish their intended objectives in enabling construction of the above described structures. Various such joining techniques are described below.

In an embodiment, a tongue-and-groove structure is used to connect two or more nodes. FIG. 1 illustrates a perspective view of an additively manufactured node-node joint 100. More specifically, node-node joint sections 100a and 100b are shown joined together at gap 108. Node-node joint 100 further includes standoff tabs 102a-c arranged around the perimeter of node-node joint 100. In an exemplary embodiment, gap 108 is a 0.25 mm gap (or a gap of another dimension) configured to enable proper spacing of nodes composed of dissimilar metals or other materials. This spacing would ensure that the two subcomponents being joined are not in physical contact so that galvanic corrosion can be avoided. The spacing isolates the nodes/subcomponents. Sealants, in addition to providing seals, may act as spacers as well. In other embodiments lacking corrosion concerns, the node-node joint sections 100a and 100b may be flush against each other such that no gap is present. Each of node-node joint sections 100a and 100b may include a side wall 110 in the interior of node-node joint 100.

Node to node joint 100 further includes inlet port 104 to enable entry of an adhesive into the node-node joint 100 and vacuum port 106 for drawing a vacuum to facilitate the flow of adhesive within node-node joint 100. In the embodiment shown, respective inlet and vacuum ports 104 and 106 are built within node 100b and designed to provide a flow of adhesive to assist in adjoining nodes 100a and 100b as described below.

Figure 2:
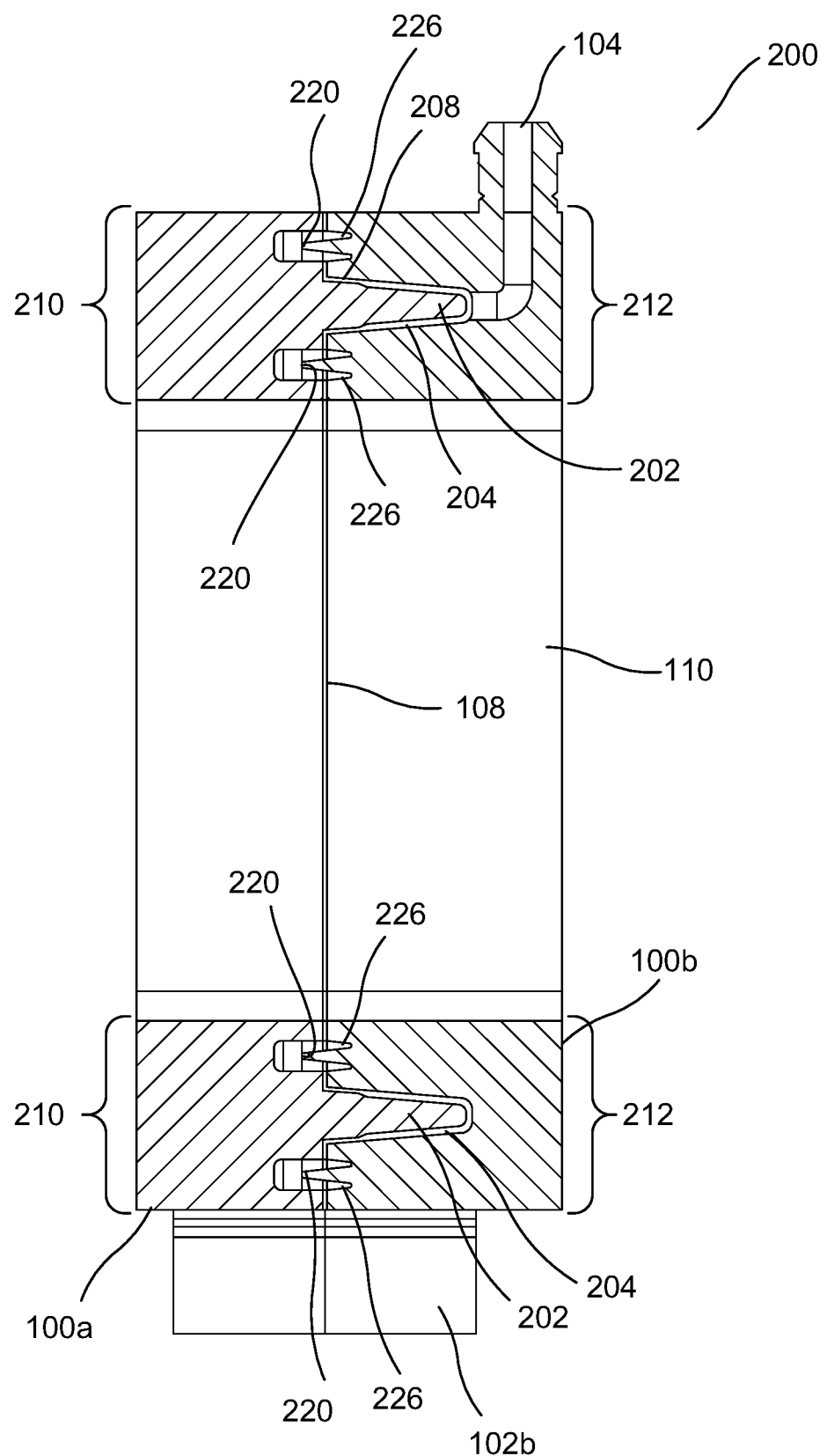
FIG. 2 shows a cross-sectional view illustrating the node-node joint of FIG. 1.

FIG. 2 illustrates a cross-sectional view of the node-node joint 200 taken along plane A-A-A-A. In this view, side wall 110 of FIG. 2 corresponds to side wall 110 of FIG. 1, and standoff tab 102b of FIG. 2 corresponds to standoff tab 102b of FIG. 1. Shown on side wall 110 of FIG. 2 is gap 108. The tongue portion 202 of the node-node joint 200 is part of node 100A, includes a first material represented by the diagonal lines of node 100A, and is disposed along a generally peripheral region 210 of the node 100A. In one embodiment, the tongue portion 202 extends all the way around the peripheral region 210 and is in effect a single protrusion disposed around the peripheral region 210. The tongue portion 202 protrudes outward along the peripheral region 210 relative to node 100B and around node 100A, and the lateral extension of tongue portion 202 can be considered in this view as coming out of the figure. The groove portion 204 of the node-node joint 200 is part of node 100B and is disposed along a generally peripheral region 212 of the node 100b. The groove portion 204 may, but need not, be composed of the material of node 100b, wherein the material is represented by the diagonal lines in node 100b that run in a direction opposite the diagonal lines of node 100a. In one embodiment, the groove portion 204 extends all the way around the peripheral region 212 and is in effect a single indentation in the node 100b all the way around peripheral region 212. The groove portion 202 is inset inward along the peripheral region 212 relative to node 100a and runs laterally around node 100b and can also be considered in this view as coming out of the figure. Tongue 202 and groove 204 may be arranged on respective nodes 100a and 100b such that when the two nodes are properly placed into contact, tongue 202 may align with groove 204 and may fit into groove 204 around the peripheral regions 210, 212.

In an exemplary embodiment, groove 204 includes centering feature 208 which is a narrow region that widens the opening of groove 202 and assists in enabling tongue 202 to properly mate with groove 204 to thereby center the node-node joint 200. In another exemplary embodiment, spill-off sealant reservoirs 226 are provided on each side of the tongue 202, each reservoir 226 having sealant grooves 220 that may be used for the application of an appropriate sealant, e.g., to control the flow of an adhesive to be applied.

As shown relative to FIGS. 1 and 2, adhesive and vacuum ports 104 and 106 are respectively provided. In one embodiment, a sealant is first applied at the sealant grooves 220 of node 100a. The two nodes 100a and 100b may then be aligned and fixed securely in place using standoff tabs 102a-c as alignment points. A vacuum may be applied at vacuum port 106 to ensure that the nodes are sealed. Once a complete seal has been obtained, an adhesive may be applied through inlet port 104. In one embodiment, the internal structure of vacuum port 106 is similar to that of inlet port 104. The adhesive-vacuum action causes the adhesive to seep into the space between the tongue 202 and the groove 204 and to flow in this space around the peripheral region 210, 212 until the adhesive has properly saturated the tongue grove connection around the peripheral region.

In an embodiment, the standoff tabs 120a-c may also be used to assist in preventing sealant pushback during the adhesive flow and curing process. Once the adhesive fills the gap between the tongue 202 and the groove 204 sections substantially completely, the adhesive may be allowed to cure. The vacuum pressure during the adhesive flow process may be monitored and may be indicative of a complete adhesive fill. On completion of the cure, the standoff tabs may in one embodiment be broken off.

Using this technique, nodes can be efficiently and durably combined. The use of AM in one embodiment creates the structure necessary for implementing the joining of the nodes such that additional processes beyond application of an adhesive and/or sealant, such as welding or the use of various external fastening mechanisms, are not necessary.

In another aspect of the disclosure, techniques for joining subcomponents of a larger additively manufactured component, such as an engine, transmission, gear case, etc., are disclosed. In the discussion that follows, the present disclosure will be illustrated in the context of an additively manufactured gear case within the transmission of a transport structure. It will be appreciated, however, that the teachings of the present disclosure are not so limited, and any number and types of additively manufactured components may be assembled using the principles describe herein.

Gear Cases and Other Components.

An exemplary embodiment will now be presented in the context of gear cases and related components used in mechanized assemblies. Rotary shaft power transmission typically encompasses a shaft supported by lubricant-cooled bearings. The bearing forces in such a structure may be modest, generated mainly from gravity and imbalance forces. With a multi-speed transmission, gears may be used to impart speed differences to match input shaft speed with output. Multi-shaft transmissions are common and may have gears on each shaft separated by a "center-distance" to allow gear tooth engagement on the outer diameter of the gears. As a result of this engagement, multi-shaft transmissions using involute gear profiles may generate forces that spread the shafts due to the pressure angle at the point of contact between the gears. The spreading force is generally reacted through the bearings and thence through a casing termed the gear case.

Gear engagement generally uses a lubricant to extend gear life to a useful level. That lubricant may also transport the friction heat away to be cooled. For example, in automotive racing applications, the gear case may also react to loads from suspension, aerodynamic loads on the vehicle, and other sources. Therefore, in that situation, a gear case may have complex loads, it may be fluid tight and, in applications with high power levels, it may operate at substantially elevated temperatures. Metallic gear case construction is often applied to power transmission applications using light alloys of aluminum, magnesium and titanium being the most common materials.

A number of different AM technologies may be well-suited for construction of gear cases and other force or power intensive components in a transport structure or other mechanized assembly. Such 3-D printing techniques may include, for example, selective laser melting (SLM), selective laser sintering (SLS), direct metal laser sintering (DMLS), electron beam melting (EBM) and other AM processes involving melting or fusion of metallic powders. As in other 3-D printing techniques, SLM, SLS and other powder-bed fusion ("PBF") systems, create build pieces layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up. SLS and various other PBF techniques may be well suited to construction of gear cases and other transport structure components. However, it will be appreciated that other AM techniques, such as fused deposition modeling (FDM) and the like, are also possible for use in such applications.

Conventional gear case construction uses a casting, which may be thin-walled to reduce mass. Large transmissions, however, have constraints related to casting pattern tooling. These constraints may drive the minimum wall thickness higher than necessary for the anticipated load cases due to, among other factors, the dimensional stability of the conventional tooling. Further, using the conventional casting technique, the minimum wall thickness may be significantly larger than necessary to ensure fluid tightness, especially in view of the fact that pressure differentials across the case may be in many applications relatively low.

Figure 3:
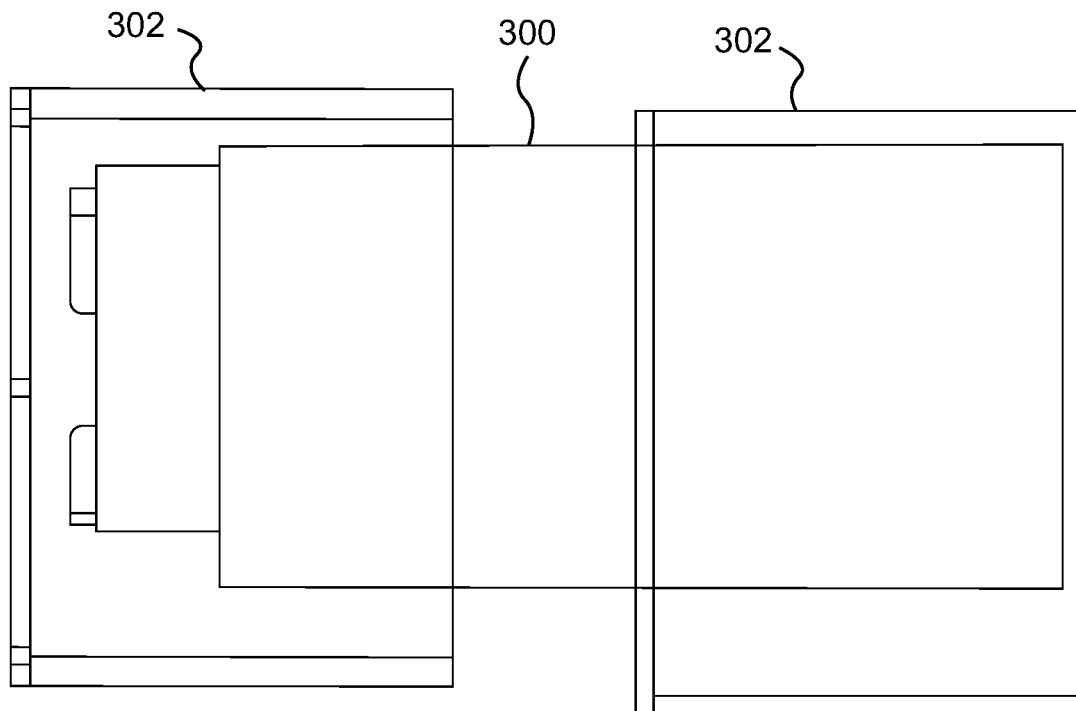
FIG. 3 shows a top down view illustrating a gear case relative to a build plate of a large format selective laser melting (SLM) machine.

Conversely, as described above, these and other conventional AM techniques, including (among others) Selective Laser Melting 3-D printers, currently have limited maximum dimensions and therefore can only render structures up to a maximum size. FIG. 3 illustrates a gear case 300 shown relative to build plates 302 associated with an exemplary large format selective laser melting machine. As is evident from the illustration, the build plate 302 is substantially smaller than the gear case 300. Accordingly, conventional selective laser melting printers and other AM techniques may necessitate various components, such as gear case 300, to constructed as a plurality of subcomponents. This is generally in contrast to traditional manufacturing techniques, which the body of the gear case may be cast as a single component. An aspect of the present disclosure therefore address solutions to integrating a plurality of AM components into a single component having properties and characteristics sufficient to accommodate the intended objectives of the component. Addressing the challenges faced by the attendant assembly of subcomponents into an integrated AM component may be particularly important if, for example, the transport of fluid internal to the component is a necessary or desired feature of the component to be constructed.

Figure 4:
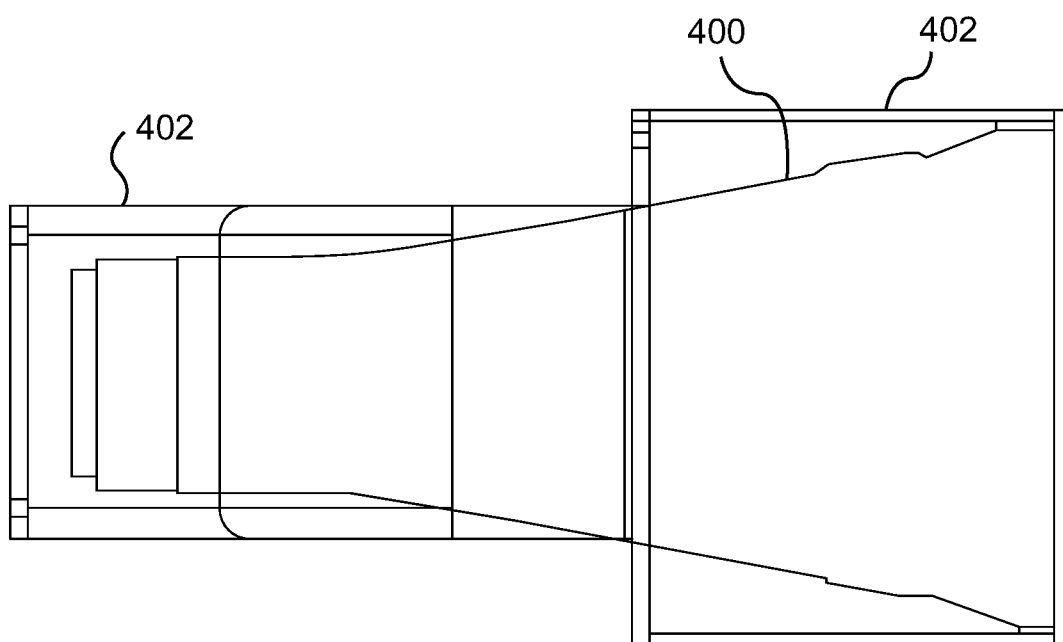
FIG. 4 shows a top down view illustrating a gear case shown relative to a build plate with the build plate 402 in different orientations.

FIG. 4 illustrates a gear case 400 shown relative to build plate 402 with the build plate 402 positioned in different orientations. In this example, a conventional PBF printer (e.g., a selective laser melting 3-D printer) may, depending on the size of gear case 400, have the capacity to render the gear case 400 using two subcomponents printed at orthogonal relative angles with respect to each other. Thus, as FIG. 4 demonstrates, in some embodiments it may be desirable to minimize the number of subcomponents by taking advantage of the geometry of the component to be designed.

As described above, using AM to render a component as a plurality of subcomponents presents unique challenges. These challenges may be particularly evident in the case of a transport structure component such as a gear case, wherein the transport of fluid lubricant or coolant may be necessary. Fluid transport pipes in such gear cases can generally be constructed with a lower mass when integrated with the gear case walls. This advantageously provides a lighter gear case and can add additional volume within the gear case to accommodate the internal structures. However, where fluid transport is desirable or necessary in an integrated AM component such as a gear case, the combination of subcomponents forming the component or gear case should be assembled together in a manner that reliably seals the transport of fluid between the subcomponents to avoid leakage of the fluid and resulting failure of the component.

Accordingly, in another aspect of the present disclosure, a component of a transport structure is additively manufactured as a plurality of subcomponents that are bonded together, at least in part, using one or more tongue-and-groove connections to form a uniform and reliably integrated component. For example, using the principles described herein, load-bearing gear cases may be constructed using multiple AM subcomponents and seamlessly integrated to form a single gear case. Thin-walled structures such as gear-cases can be bonded together from their constituent AM subcomponents.

Figure 5:
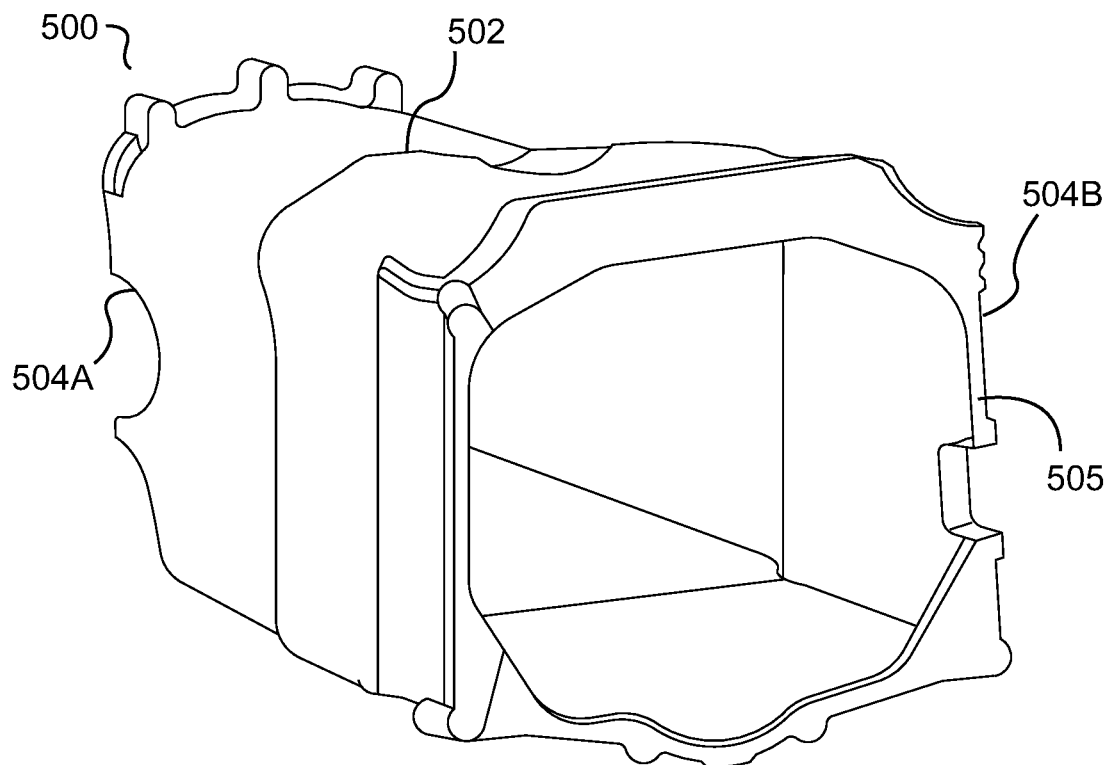
FIG. 5 shows a perspective view illustrating the gear case of FIG. 3.

FIG. 5 illustrates a perspective view of the gear case 500 of FIG. 3. In this exemplary embodiment, the gear case 500 has been additively manufactured as two subcomponents separated by line 502. Each subcomponent 504A and 504B includes a wall 505. The subcomponents 504A and 504B of gear case 500 have been seamlessly bonded together at the wall 505 extending around the periphery of line 502 to form a single component 500, as described in further detail below. It should be noted that, unlike conventional techniques in which larger gear cases may be cast with unnecessarily thick walls that add undesirable mass and volume and that result in reduced performance of the associated transport structure, the walls 505 of the gear case 500 in FIG. 5 may be 3-D printed at the precise specification necessary to withstand the associated pressures without the addition of unnecessary material.

Figure 6:
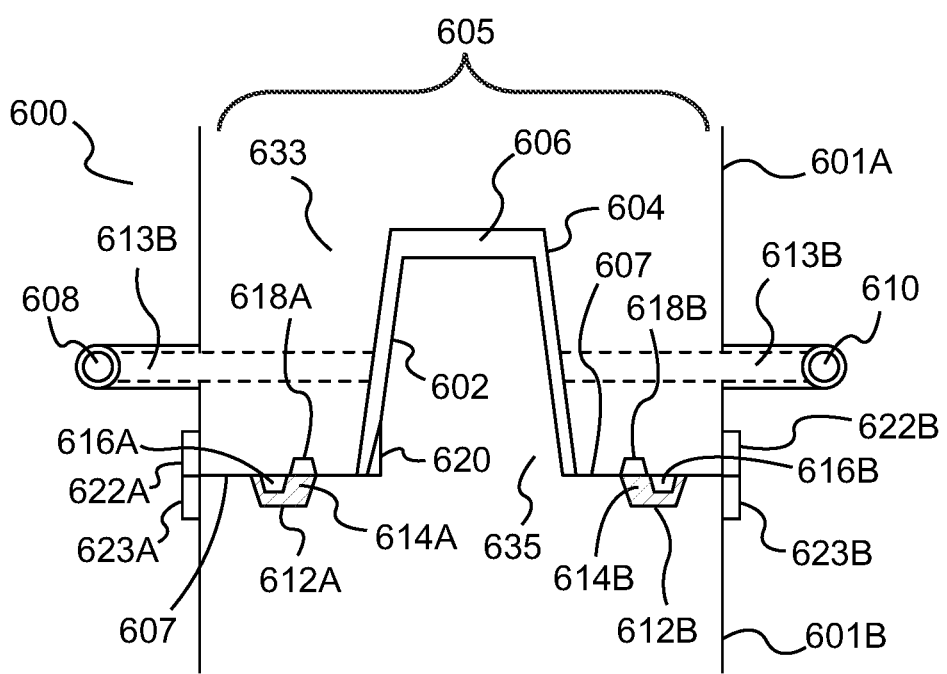
FIG. 6 shows a cross-sectional view illustrating an additively-manufactured tongue-and-groove joint.

In an embodiment, a tongue-and-groove connection is used to bond the subcomponents. The tongue-and-groove connection may include the use of adhesive reacting loads between the components via shear. FIG. 6 shows a cross-section of an additively-manufactured tongue-and-groove joint 600 running along respective edges of gear case walls 605, with one wall associated with a first subcomponent and one wall associated with a second subcomponent. In particular, FIG. 6 shows a cross-sectional view of the edges of the walls at intersection 502 (FIG. 5) with the edges running into and out of the illustration. The joint 600 includes wall edges 607, which may correspond to and be associated with a first subcomponent 601B and a second subcomponent 601A. The joint 600 further includes tongue 602 and groove 604. In one embodiment, tongue 602 is disposed along a first peripheral region 635 of the first subcomponent 601B of gear case 500 (FIG. 5), and groove 604 is disposed along a second peripheral region 633 of the second subcomponent 601A of gear case 500. As is evident from the illustration, tongue 602 and groove 604 are tapered in this embodiment for ease of assembly (i.e., for ease of insertion of the tongue into the groove), and the respective edges 607 of walls 605 are in contact or are in close proximity.

The gap 606 between the tongue 602 and groove 604 may be filled with an adhesive. For example, an adhesive may be injected using vacuum infusion thru external fill port 610 arranged on a first side of subcomponent 601A as a vacuum is drawn through a vacuum port 608 arranged on a second side of subcomponent 601A to spread the adhesive through the gap 606.

The subcomponents 601A-B may further include seal grooves 612A and 612B that may in one embodiment be built into an edge 607 of subcomponents 601B. In an exemplary embodiment, the seal grooves 612A-B are filled with an elastomeric sealant 614A-B, which may cured prior to adhesive infusion to control and limit the flow of adhesive. This curing may also enable a strong vacuum to be created during adhesive infusion via deformation of the sealant around protruding seal compression features 616A-B and seal expansion void 618A-B, the latter feature disposed on edge 607 of subcomponent 601A. The gap 606 between the tongue 602 and groove 604 may be a nominal thickness. In one embodiment, the gap 606 is approximately 500 microns, although a number of other thicknesses are possible. The gap 606 may be properly preserved via use of a centering feature 620 disposed at the widest point of the groove 604.

Further, in an exemplary embodiment, the joint portion at edges 607 located outboard of the seal grooves 612A-B (i.e., to the right of seal groove 612B and to the left of seal groove 612A) may be designed with a void (not shown) between the bonded subcomponents 601A-B to prevent fretting and galvanic corrosion between dissimilar metals. Joint clamping features 622A, 623A and 622B, 623B can assist in maintaining such a void. Clamping features 622A, 623A and 622B, 623B may have material proud of the interface surface to provide the void when the clamping feature 622A contacts clamping feature 623A on one side of walls 605 and when the clamping feature 622B contacts 623B on the other side of walls 605.

In an embodiment, the void extends across the entire subcomponent interface (edges 607). However, the void may be filled with adhesive or sealant at areas inboard of seal grooves 612A-B but the void may not be filled in areas outboard of seal grooves 612A-B. Seal expansion voids 618A-B on subcomponent 601A may allow sealant from seal grooves 612A-B to expand as necessary to provide a strong seal. In another embodiment, the vacuum port 608, the fill port 610, and the clamping features 622-23A and 622-23B may be notched to allow fractured removal of the attaching features 613A and 613B after the joint is fully bonded.

In another aspect of the disclosure, a component includes a fluid pipe running substantially along or adjacent to one of the walls of the component. In one embodiment, the fluid pipe is integrated with the walls of gear case 500 (FIG. 5) to achieve the aforesaid advantages. In other embodiments, the fluid pipe is separate from but proximate to the walls of the component. In yet other embodiments, the fluid pipe is internal to the subcomponent at some desired location.

The fluid pipe, which may carry lubricant, coolant, or another suitable fluid, may span across a joint defined by edges 607 of subcomponents 601A and 601B. Should a fluid pipe need to span such a bonded joint, the joint can be sealed both around the fluid pipe and the gear case wall 605.

Figure 7:
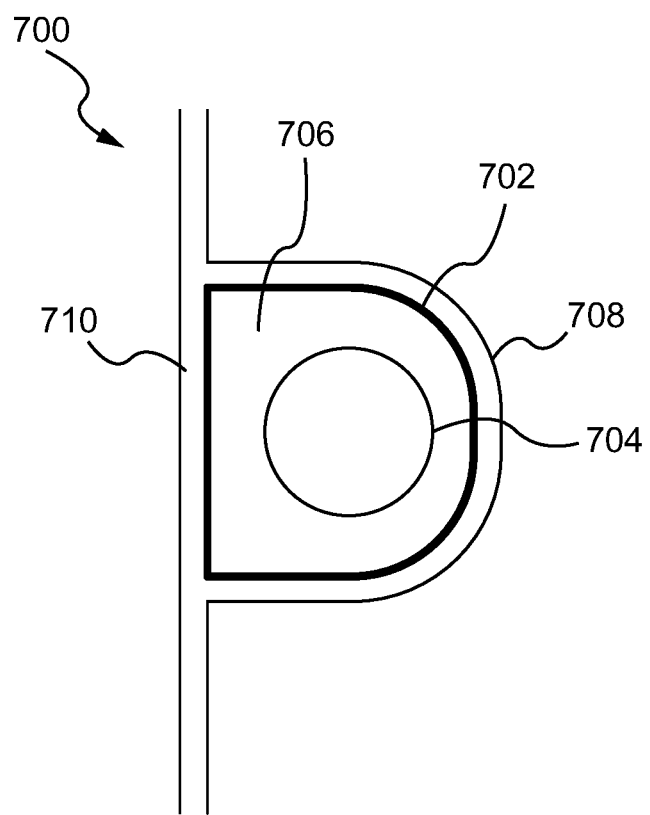
FIG. 7 shows an interface plan view illustrating a fluid pipe interface including a cross-section of a pipe for transporting fluid between subcomponents.

FIG. 7 shows an interface plan view of a fluid pipe interface 700 including a cross-section of fluid pipe 704 for transporting fluid between subcomponents. That is, FIG. 7 shows a cross-section of a joint in which fluid may travel in a direction in or out of the illustration relative to a viewer. The plan view shows a fluid pipe interface 700 near wall 710 of a first subcomponent that may be configured to securely bond with a similarly structured fluid pipe interface of a second subcomponent. The fluid pipe interface 702 may further include a generally flat section 706 designed to be positioned substantially flush with a similar section on another subcomponent. In other embodiments, the section 706 may be contoured or may have another shape. The fluid pipe interface 700 may also include an outer wall 708 disposed about its periphery and adjoining subcomponent wall 710. In addition, the fluid pipe interface 700 may include tongue-and-groove joint 702. In an exemplary embodiment, tongue-and-groove joint 702 includes a tongue protrusion sticking out orthogonally relative to the plane of the illustration and is configured to mate with a similar groove section associated with a fluid pipe interface of another subcomponent. Alternatively, tongue-and-groove joint 702 may include a groove inset into a plane of the illustration and designed to receive a similar tongue section associated with a fluid pipe interface of another component. In some embodiments, the tongue-and-groove joint 702 need not extend entirely around the perimeter of fluid pipe as shown in FIG. 7, but rather may be constructed to extend partially along or near such a perimeter.

Figure 8:
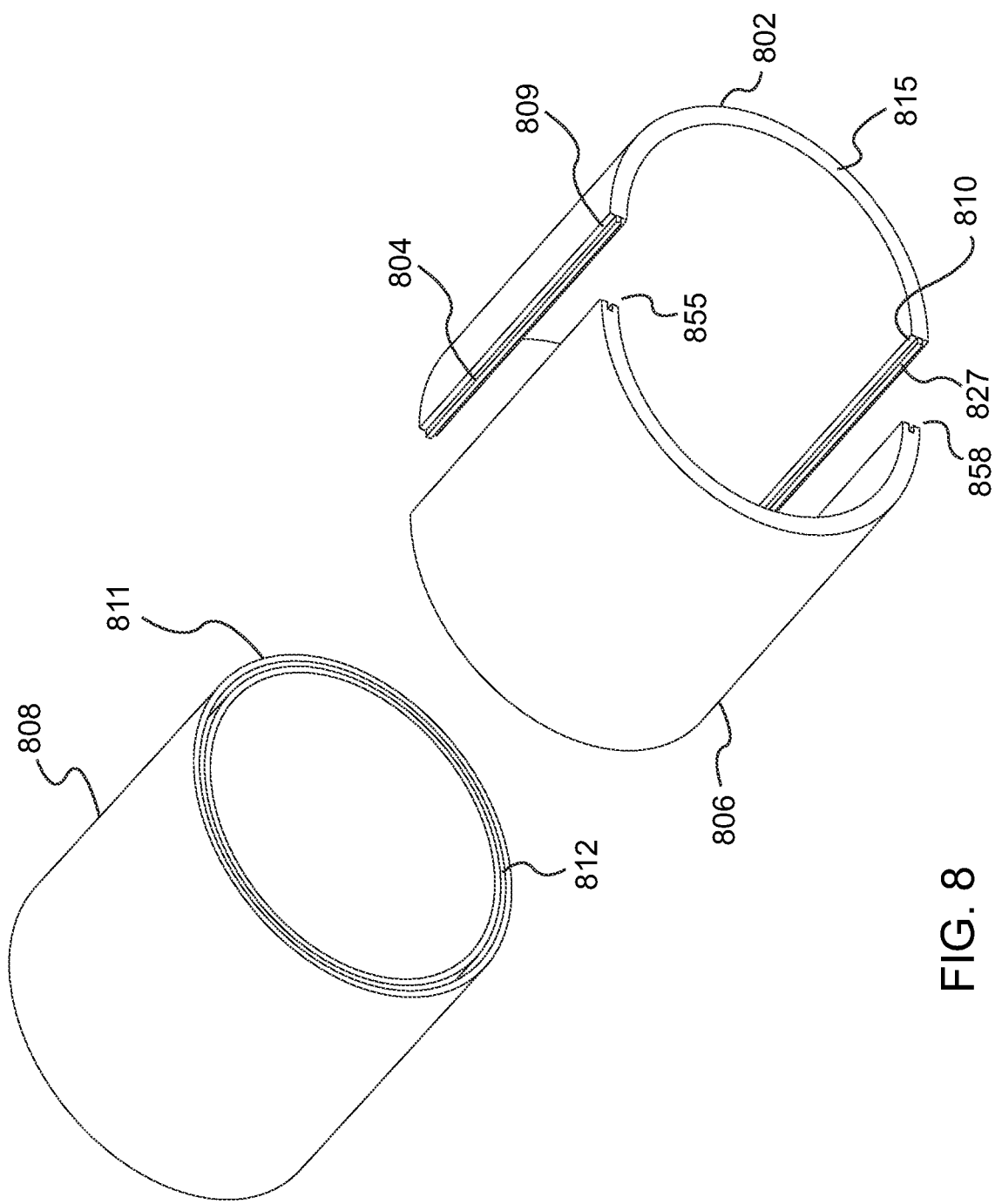
FIG. 8 shows a perspective view illustrating a plurality of additively manufactured subcomponents configured to be joined together as a component via a plurality of tongue-and-groove connections.

FIG. 8 is a perspective view illustrating a plurality of AM subcomponents 802, 806, 808 configured to be joined together as a component via a plurality of tongue-and-groove connections. For clarity, a substantially cylindrical set of subcomponents is illustrated; however, a wide variety of shapes, sizes and configurations of subcomponents is possible depending on the nature of the component and the overall configuration. Further, for clarity, the internal structures that may be housed within the subcomponents or the component are omitted from the illustration.

In this exemplary embodiment, each of subcomponents 802 and 806 constitute portions of a cylindrically shaped structure. Subcomponent 802 may include an outer wall 815 having an edge 809 which in this example includes a tongue protrusion 804. Similarly, subcomponent 806 may be configured to have a groove connection 855 to receive and mate with tongue protrusion 804. Generally, depending on the configuration, tongue-and-groove connection 804 may include either a tongue or a groove and may be configured to mate with a corresponding edge (partially obscured from view) of subcomponent 806 as previously described. Similarly, a tongue protrusion 827 (or, in other cases, a groove connection) may be disposed on another edge 810 of subcomponent 802, and may be configured to mate with a corresponding groove connection 858 of subcomponent 806.

In addition, FIG. 8 shows cylindrically-shaped subcomponent 808 which in this embodiment is designed to mount flush against the mated combination of subcomponents 802 and 806. Subcomponent 808 may include an outer wall having an edge 811 in which another tongue-and-groove connection 812 may be disposed on the edge 811 around a peripheral region of subcomponent 808. The tongue-and-groove connection 812 may thereupon be mated with the combined corresponding tongue-and-groove connection (obscured from view) provided by the far end of subcomponents 802 and 806.

It should be noted that depending on the configuration, the tongue-and-groove connections of the various subcomponents may be substantially orthogonal or otherwise at different angles relative to one another. For example, in this embodiment, tongue-and-groove connection 804 is substantially orthogonal to tongue-and-groove connection 812. In other embodiments, tongue-and-groove connection 812 need not traverse the entire perimeter of subcomponent 808, and tongue protrusions 804 and 827 similarly need not traverse the entire length of the respective edges 809 and 810 of subcomponent 806.

Figure 9:
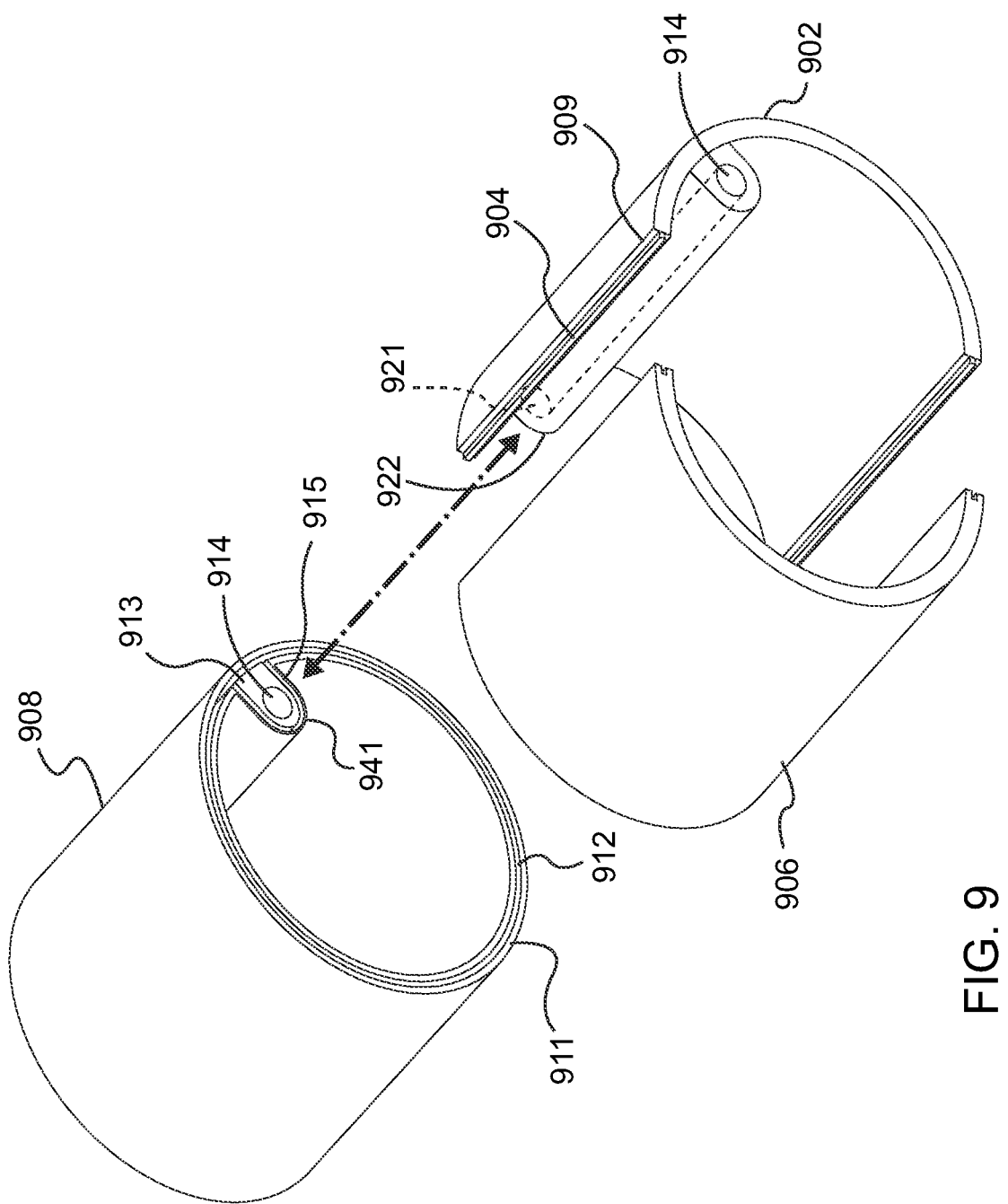
FIG. 9 shows a perspective view illustrating a plurality of subcomponents having a fluid pipe interface proximate a wall of the subcomponents for transporting fluid through the combined component.

FIG. 9 shows a perspective view illustrating a plurality of subcomponents having a fluid pipe interface 922 proximate a wall of the subcomponent 902 for transporting fluid in a sealed manner through the combined, integrated component. Subcomponent 902 may include an edge 909 having a tongue-and-groove connection 904 and configured to mate with a corresponding tongue-and-groove connection of subcomponent 906 to form an integrated combination of subcomponents 902 and 906. Further shown is fluid pipe 914 which may be integrated with, or disposed proximate to, a wall of subcomponent 902 and which may be configured to transport fluid within the integrated component. Subcomponent 902 may further include a fluid pipe interface 922 that includes fluid pipe segment 921. In an embodiment, fluid pipe interface 922 may be configured to mount substantially flush against corresponding fluid pipe interface 941 of subcomponent 908. In this manner, fluid pipe segment 921 can be seamlessly aligned with fluid pipe segment 914 of subcomponent 908 to enable fluid to flow through the resulting integrated component.

Subcomponent 908 in this embodiment is a generally cylindrically-shaped structure that includes a wall having edge 911 along which a tongue-and-groove connection 912 may be disposed for mating with subcomponents 902 and 906 along a peripheral region of the subcomponents. As noted above, fluid pipe interface 941 of subcomponent 908 may include a generally flat section 913 configured to be positioned substantially flush with a corresponding section (obscured from view) on fluid pipe interface 922 of subcomponent 902.

Fluid pipe interface 941 of subcomponent 908 may further include another tongue-and-groove connection 915 configured to mate with a corresponding tongue-and-groove connection disposed on fluid pipe interface 922 of subcomponent 902. The corresponding tongue-and-groove connection on fluid pipe interface 922 of subcomponent 902 may be substantially similar in geometrical structure to the fluid pipe interface 941 except that the former may include an opposite mating structure, i.e., a groove if tongue-and-groove connection 915 is a tongue, and vice versa.

While not required, in an exemplary embodiment section 913 is substantially flat so that it can be firmly pressed flush against a corresponding flat section of subcomponent 902; in other embodiments, the section 913 may not be flat or may include a structure amenable to house a seal around the fluid pipe 814. In other embodiments, section 913 may be contoured or textured or may include another shape suitable for adjoining with a complementary section on fluid pipe interface 922 of subcomponent 902. The resulting component has a solid and flush joinder of respective fluid pipe interfaces 922, 941 that enables the unimpeded flow of the fluid within the component. In various embodiments and depending on the AM component being fabricated, one or more orifices (not shown) may be built into the subcomponents to enable the pipe to protrude and/or the fluid to be provided to or from an external source.

The ability to generate contiguous internal voids for the passage of fluid as demonstrated in FIGS. 7-9 above allows construction of other fluid carrying mechanisms internal to the component. One such example includes the use of fluid-fluid heat exchangers internal to a gear case. However, a number of different embodiments and applications are possible depending on the nature and structure of the AM component.

In another aspect of the disclosure, AM components for transport structures and other mechanized assemblies may be designed and assembled using a plurality of nodes connecting shear panels. In one embodiment, a gear case for a transport structure is assembled using multiple AM subcomponents to integrate a plurality of shear panels into a component for use in a transport structure or other mechanized assembly.

Figure 10:
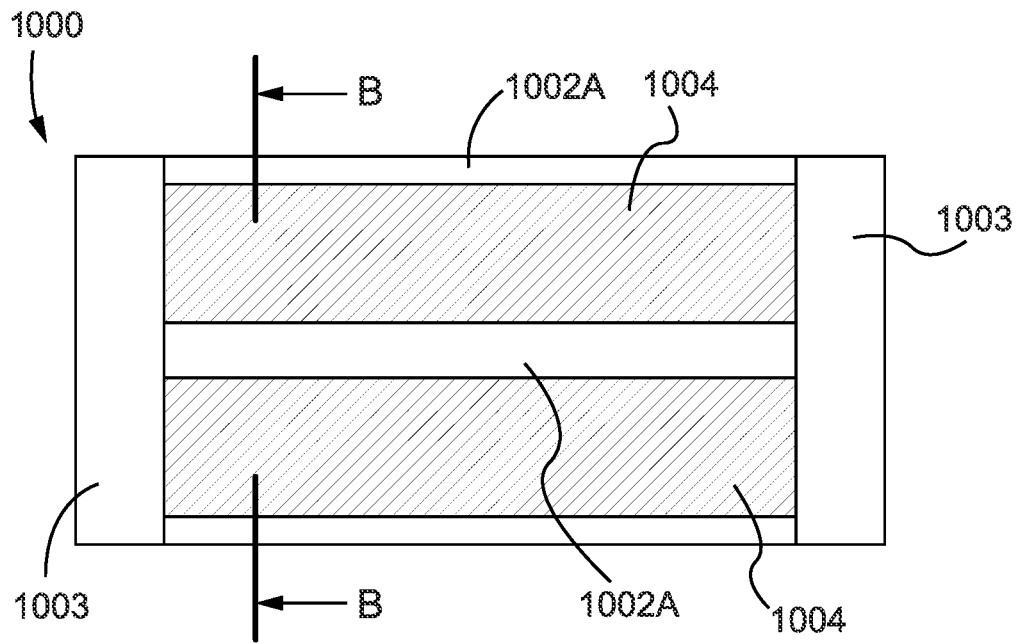
FIG. 10 shows a side view illustrating a gear case having metallic nodes.

FIG. 10 shows a side view of a hexagonal-shaped gear case 1000 having AM nodes 1002A which, in one exemplary embodiment, may be additively manufactured using a suitable metal material. The AM nodes 1002A may be configured to include, in locations where the gear case 1000 can tolerate planar geometry, one or more interfaces for bearings, shafts, and other structures internal to the gear case 1000. In this view, two shear panels 1004 of the hexagonal-shaped gear case 1000 may be secured between respective AM nodes 1002A. AM nodes 1002A may include extending structures or insets (not shown) for mating with respective sides of shear panels 1004, e.g., via a tongue-and-groove connection, an adhesive, or another suitable bonding mechanism. The AM nodes 1002A may be configured with sockets or insets to locate shear panels 1004 during assembly. The AM nodes 1002A may also provide sealing interfaces for the shear panels 1004. In one exemplary embodiment, AM nodes 1002A may use double shear receiving pockets for receiving a shear panels 1004 on each side. Assembly of the gear case 1000 may trap the shear panels 1004 between adjacent AM nodes 1002A. At each end of the hexagonal gear case 1000, AM nodes 1002A may terminate in a central portion 1003 of the AM node which in some embodiments may operate to couple together and secure the various AM nodes 1002A, and hence the shear panels 1004 to which the AM nodes 1002A are coupled.

Figure 11:
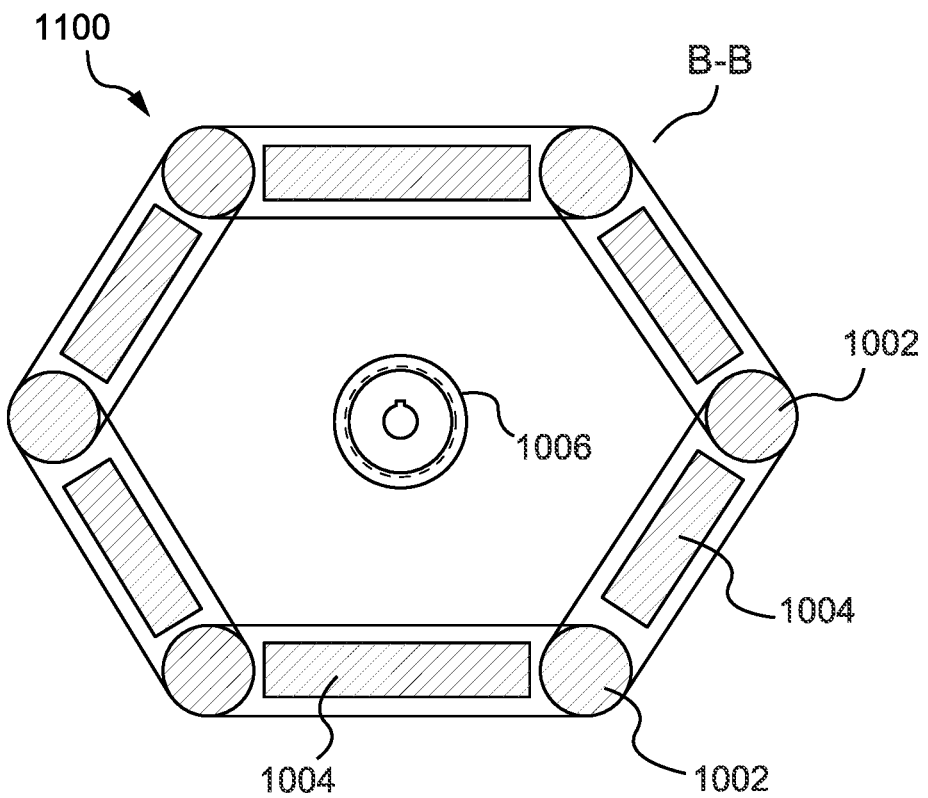
FIG. 11 shows a cross-sectional view illustrating a hexagonal-shaped gear case constructed using nodes and shear panels.

FIG. 11 shows a cross-sectional view (B-B, see FIG. 11) illustrating the hexagonal-shaped gear case 1100 constructed using nodes and shear panels. Each of a plurality of AM nodes 1002 are used to connect a corresponding pair of shear panels 1004. The nodes 1002 and shear panels 1004 may be used as an assembly to enclose internal structures in gear case 1100, such as bearing 1006. Nodes 1002 and corresponding shear panels 1004 may use a number of possible connection mechanisms, including for example the tongue-and-groove configuration as described herein. Alternatively, the node may include a socket and/or one or more locating features for accepting panels or other structures. In some embodiments, nodes may include channels for providing adhesives and drawing vacuums. Nodes may also be simple in construction, and may include, for example, inset areas for accepting panels. In general, the configuration of the node may be in accordance with the application and objectives.

As FIGS. 10-11 illustrate, assembly of gear cases using multiple AM subcomponents enables structures such as shear panels to be captured between AM metal parts. In an exemplary embodiment, the AM metal parts are rendered using a PBF technique, such as SLM. The shear panels 1004 are, in an exemplary embodiment, planar commercial off the shelf (COTS) carbon composite sheets that are configured to seal fluids and transfer shear loads. Carbon composites may be considered because currently, they have the highest specific strength among available structural materials. However, shear panels composed of other materials are possible. Transfer of shear loads may require interfaces on the AM nodes and other AM subcomponents that allow bonding and sealing, as described above. In this manner, a gear case having an overall lower mass may be constructed.

Figure 12A:
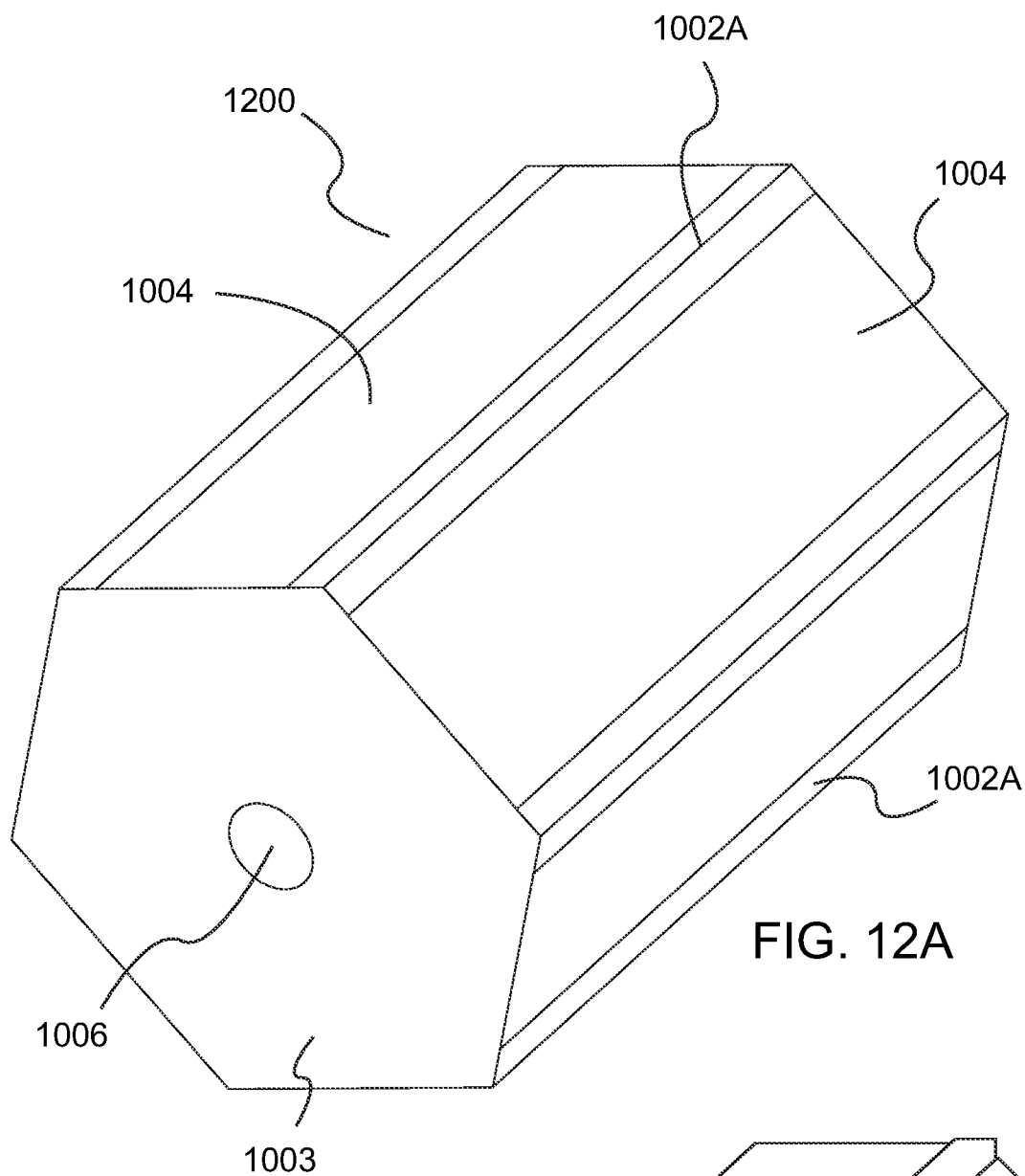
FIG. 12A shows a perspective view illustrating the hexagonal-shaped gear case.

FIG. 12A shows a perspective view illustrating the hexagonal-shaped gear case 1200 formed using the principles described herein. The gear case 1200 includes a plurality of panels 1202, each of two sides of a panel 1202 joined with a respective node 1002A to form a hexagonal-shaped structure having six panels 1202 and six nodes 1002A. In one embodiment, the nodes 1002A are coupled to opposite sides of the structure via a section 1003. Each panel 1202 in one embodiment is wedged into a socket or groove connection disposed on each side of node 1002A, as shown in more detail in FIG. 12B.

Figure 12B:
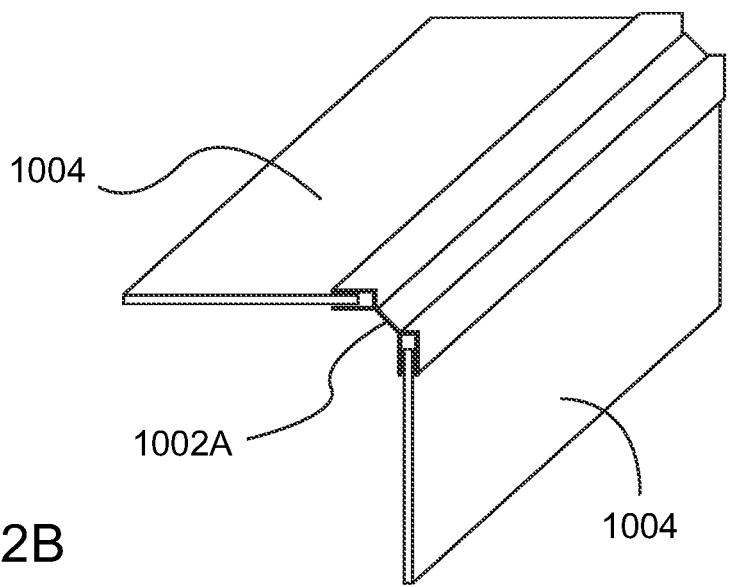
FIG. 12B shows an exploded perspective view of two exemplary panels mated with a node as used in the gear case of FIG. 12A.

Referring to FIG. 12B, an exploded perspective view of a node 1002A used in the structure of FIG. 12A is shown. As is evident from the illustration, node 1002A has a slightly bent geometrical shape conducive to forming a portion of a hexagon. In addition, node 1002A in this embodiment includes insets or sockets on each side, into which panel panels 1004 can be secured. An appropriate adhesive may be used to further secure the panels in some embodiments.

It will be appreciated that the gear case 1200 of FIG. 12A, and similar structures for use in a mechanized assembly, can take on any number of possible shapes and sizes, including symmetrical and asymmetrical shapes, and need not be limited to a hexagonal shape. It should be noted that application of the principles of the present disclosure may enable the additive manufacturing of components having a size range from small to very large, because a large component can be constructed from a plurality of constituent AM subcomponents. Further, COTS parts or other custom parts that are not 3-D printed may be incorporated into the overall components, such as the situation with the gear case of FIG. 12A.

Figure 13:
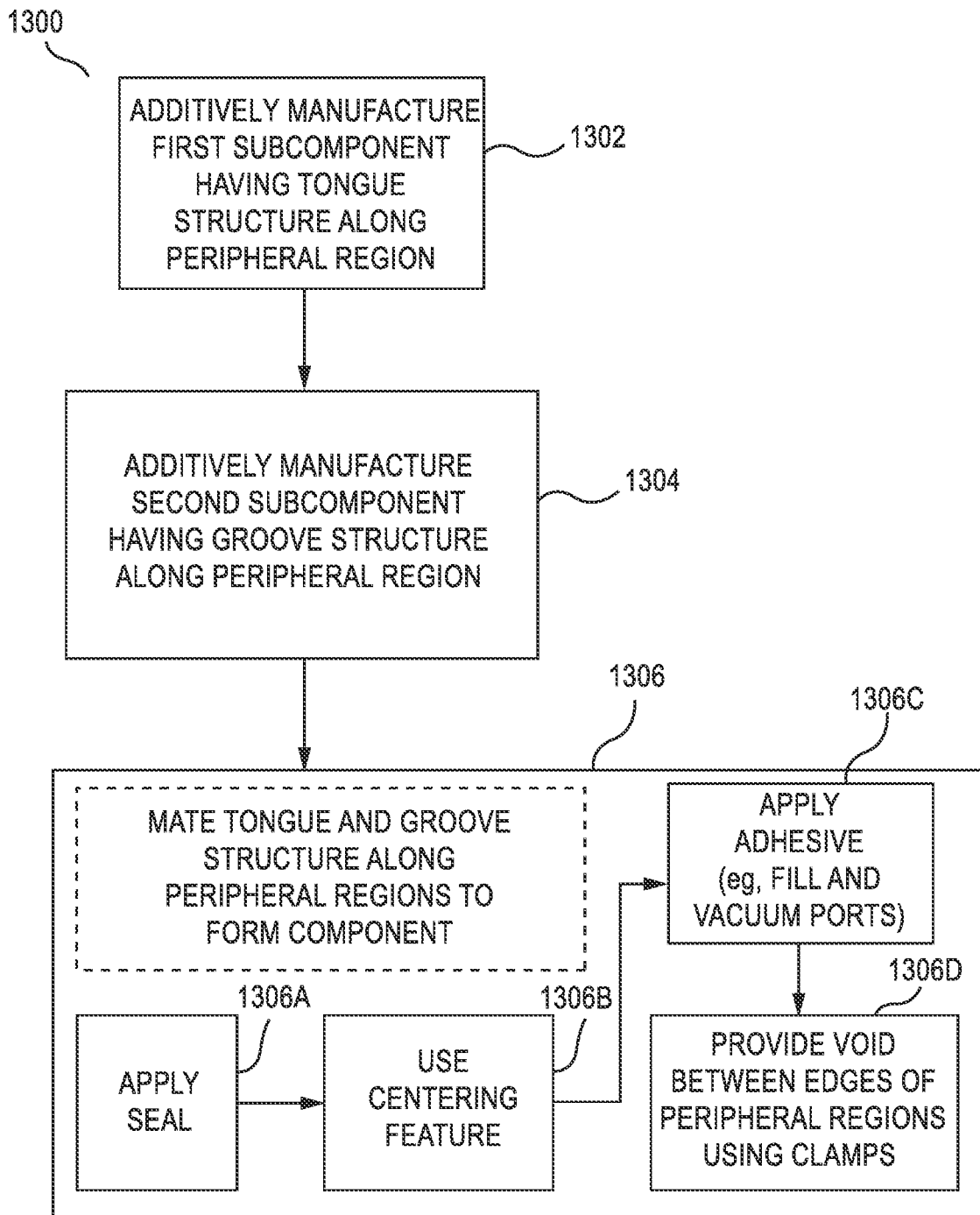
FIG. 13 shows a flow diagram illustrating an exemplary method for additively manufacturing a component in a transport structure.

FIG. 13 shows a flow diagram 1300 illustrating an exemplary method for additively manufacturing a component for use in a transport structure or other mechanized assembly. It should be understood that the steps identified in FIG. 13 are exemplary in nature, and a different order or sequence of steps, and additional or alternative steps, may be undertaken as contemplated in this disclosure to arrive at a similar result. At step 1302, a first subcomponent may be additively manufactured having a tongue structure, e.g., disposed along an edge of a wall of the subcomponent or otherwise disposed partially or completely about a peripheral region of the subcomponent. Similarly, at step 1304, a second subcomponent may be additively manufactured having a complementary groove structure along a wall edge or a peripheral region such that the groove structure is configured to mate with the tongue structure associated with the first subcomponent when the two subcomponents are joined.

Thereupon, at step 1306, the respective tongue-and-groove structures associated with the first and second subcomponents may be mated to form the resulting AM component. The mating process may be accomplished using a variety of techniques. As one illustration, at step 1306A, a sealant may be applied between respective areas of the tongue-and-groove section, e.g., to contain the flow of an adhesive, to facilitate a strong vacuum, and/or to assist in securing the two subcomponents. At step 1306b, one or more centering features may be used to assist in mating the subcomponents. At step 1306c, an appropriate adhesive may be applied via a fill port and a separate vacuum port may be implemented to draw a vacuum that causes the adhesive to spread through the spaces between the tongue-and-groove connection. At step 1306d, a set of clamping mechanisms may be used to assist in providing a void between respective edges of the peripheral regions in order to accommodate the coexistence of dissimilar metals or other materials at the area of joint. As noted above, the void provided may operate to prevent galvanic corrosion of the materials.

Figure 14:
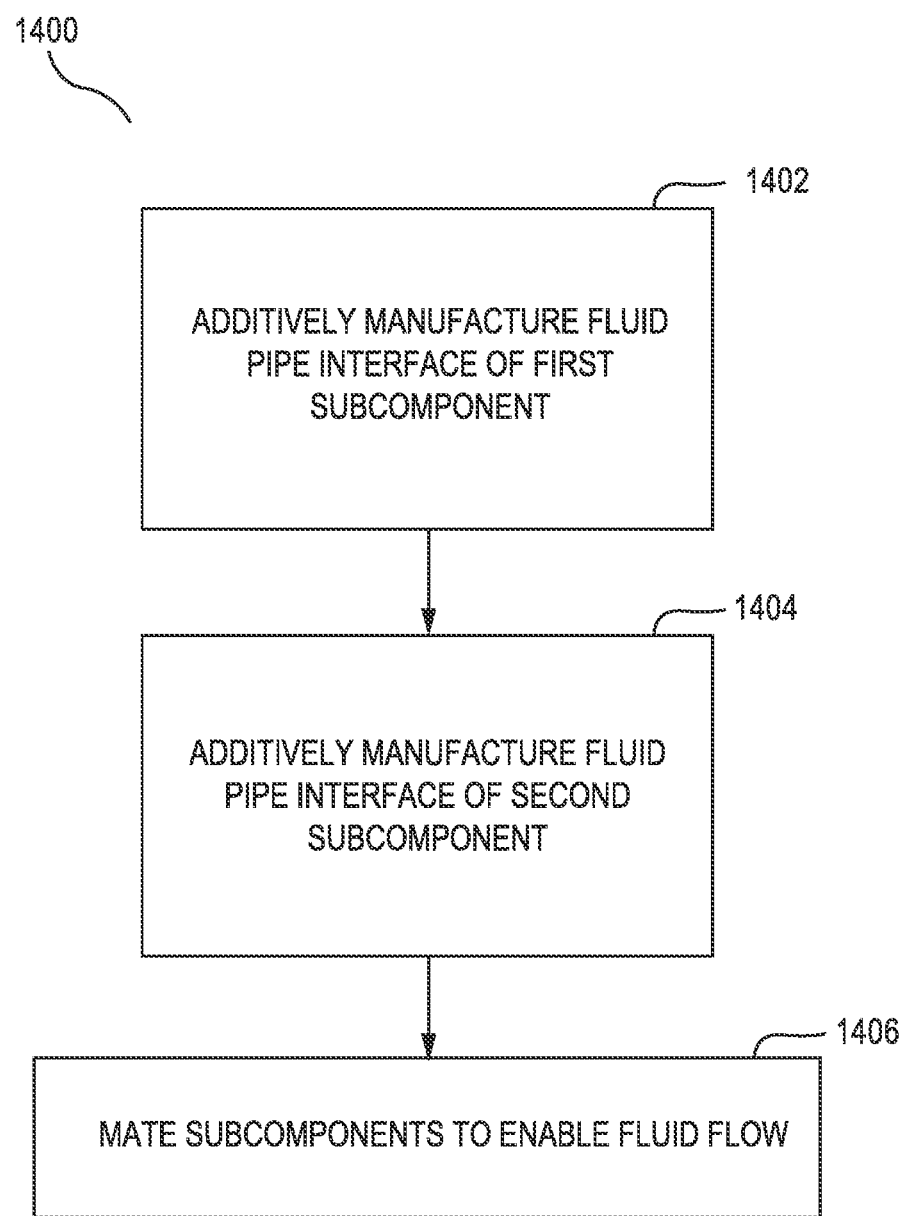
FIG. 14 shows a flow diagram illustrating an exemplary method for additively manufacturing a fluid pipe interface in a component.

FIG. 14 shows a flow diagram 1400 illustrating an exemplary method for additively manufacturing fluid pipe interfaces in a component for enabling the flow of fluid in the component. As with respect to FIG. 13, the number, sequence, and type of steps to accomplish these objectives may vary depending on the configuration and objectives. At step 1402, the AM of the first subcomponent includes additively manufacturing a first fluid pipe interface running substantially adjacent a first peripheral region associated with the first subcomponent. In some embodiments as described above, the fluid pipe interface may be integrated with the wall of the first subcomponent to accommodate reductions in mass and volume. The first fluid pipe interface may be partially or completely surrounded by, or may otherwise include, a tongue-groove connection which may be either a protruding tongue or an inset groove.

At step 1404, the AM of the second subcomponent includes additively manufacturing a second fluid pipe interface running substantially adjacent, or integrated as part of, a second peripheral region associated with the second subcomponent. The second fluid pipe interface is partially or completely surrounded by, or otherwise includes, a complementary tongue-and-groove connection configured to mate with the tongue-and-groove connection associated with the first fluid pipe interface.

Thereupon, at step 1406, the first and second subcomponents are mated using the tongue-groove connections of the fluid pipe interfaces, and, in some embodiments, the subcomponents themselves are concurrently mated using the separate tongue-and-groove connections associated with the first and second subcomponents as described with reference to FIG. 13, above. Step 1406 may include, in an exemplary embodiment, one or more procedures associated with the mating process. For example, fill and vacuum ports may be additively manufactured or co-printed with the subcomponents to assist in applying an adhesive. Further, adhesive may be added to the spaces between the applicable tongue-groove connections to thereby ensure that the fluid pipe interfaces are substantially flush with one another and to enable the flow of fluid along a periphery of the resulting integrated component. As with respect to FIG. 13, these steps may occur in any order depending on the implementation, and additional or alternative steps may be employed to secure the subcomponents and their respective interfaces.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing and joining nodes and subcomponents. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
   an additively manufactured first subcomponent comprising a tongue structure; and
   an additively manufactured second subcomponent comprising a groove structure configured to mate with the tongue structure,
   wherein the first subcomponent includes a first fluid pipe interface,
   the second subcomponent includes a second fluid pipe interface, and
   the first fluid pipe interface is mated with the second fluid pipe interface to enable fluid flow between the first subcomponent and the second subcomponent.

2. The apparatus of claim 1, wherein the tongue structure is mated with the groove structure to form the at least a portion of a component for use in a transport structure.

3. The apparatus of claim 2, wherein the component comprises a gear case.

4. The apparatus of claim 2, wherein the component comprises a load-bearing component.

5. The apparatus of claim 1, wherein the tongue-and-groove structures are configured to seal a first peripheral region and a second peripheral region of the respective first and second subcomponents.

6. The apparatus of claim 2, further comprising an adhesive applied between the tongue-and-groove structures.

7. The apparatus of claim 6, wherein the adhesive is applied via a fill port providing a flow to a first area between the tongue-and-groove structures.

8. The apparatus of claim 7, wherein the adhesive is drawn via a vacuum port to a second area between the tongue-and-groove structures distal from the first area.

9. The apparatus of claim 2, further comprising a tongue centering feature disposed longitudinally within one side of the tongue structure.

10. The apparatus of claim 5, further comprising first and second seal grooves disposed longitudinally along the first peripheral region adjacent first and second sides of the tongue structure, the seal grooves configured to accept a compliant seal.

11. The apparatus of claim 10, further comprising at least one clamping feature disposed between the first and second peripheral regions and adjacent the first or second seal grooves, the at least one clamping feature configured to provide a void between edges of the first and second peripheral regions for preventing galvanic corrosion of dissimilar materials.

12. The apparatus of claim 11, wherein the at least one clamping feature is removable.

13. The apparatus of claim 5, further comprising at least one seal expansion void channel disposed longitudinally along the second peripheral region adjacent the groove structure.

14. The apparatus of claim 5, further comprising at least one seal compression feature disposed longitudinally along the first peripheral region adjacent the tongue structure.

15. The apparatus of claim 5, wherein the first and second peripheral regions comprise at least a portion of an outer wall of the gear case.

16. The apparatus of claim 1,
wherein the first fluid pipe interface includes a second tongue structure,
the second fluid pipe interface includes a second groove structure into which the second tongue structure is mated, and
wherein the second tongue-and-groove mated structures are sealed to enable the fluid flow between the subcomponents.

17. The apparatus of claim 1,
wherein the first fluid pipe interface includes a second groove structure,
the second fluid pipe interface includes a second tongue structure mating with the second groove structure,
wherein the second tongue-and-groove mated structures are sealed to enable the fluid flow between the subcomponents.

18. An apparatus, comprising:
an additively manufactured first subcomponent comprising a first outer wall and a first fluid pipe interface adjacent an edge of the first outer wall, the first fluid pipe interface comprising a first casing including a tongue structure extending outward relative to the edge of the first outer wall; and
an additively manufactured second subcomponent comprising a second outer wall and a second fluid pipe interface adjacent an edge of the second outer wall, the second fluid pipe interface comprising a second casing including a respective groove structure positioned to receive the tongue structure when the first and second subcomponents are joined,
wherein the first and second fluid pipe interfaces are sealed flush via a connection between the tongue-and-groove structures to enable fluid to flow between subcomponents.

19. The apparatus of claim 18, wherein the tongue structure is disposed substantially around a periphery of the first casing.

20. The apparatus of claim 19, wherein the groove structure is disposed substantially around a periphery of the second casing.

21. The apparatus of claim 18, wherein the edge of the first outer wall is configured to join an edge of the second outer wall along a periphery of the first and second outer walls via a second tongue-and-groove connection.

* * * * *